United States Patent
Shigematsu

(10) Patent No.: US 11,851,007 B2
(45) Date of Patent: Dec. 26, 2023

(54) VEHICLE-MOUNTED CAMERA AND DRIVE CONTROL SYSTEM USING VEHICLE-MOUNTED CAMERA

(71) Applicant: SONY SEMICONDUCTOR SOLUTIONS CORPORATION, Kanagawa (JP)

(72) Inventor: Kazuma Shigematsu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 502 days.

(21) Appl. No.: 17/250,493

(22) PCT Filed: Jul. 19, 2019

(86) PCT No.: PCT/JP2019/028463
§ 371 (c)(1),
(2) Date: Jan. 28, 2021

(87) PCT Pub. No.: WO2020/031660
PCT Pub. Date: Feb. 13, 2020

(65) Prior Publication Data
US 2021/0291750 A1  Sep. 23, 2021

(30) Foreign Application Priority Data

Aug. 6, 2018  (JP) .................. 2018-147409

(51) Int. Cl.
*B60R 11/04* (2006.01)
*G03B 30/00* (2021.01)
(Continued)

(52) U.S. Cl.
CPC .......... *B60R 11/04* (2013.01); *G01C 21/3407* (2013.01); *G02B 5/208* (2013.01);
(Continued)

(58) Field of Classification Search
CPC .......... B60R 11/04; B60R 2011/00263; G01C 21/3407; G02B 5/208; G03B 30/00;
(Continued)

(56) References Cited

U.S. PATENT DOCUMENTS

2018/0069994 A1   3/2018  Nakamura
2019/0082150 A1   3/2019  Murata et al.

FOREIGN PATENT DOCUMENTS

CN   107809564 A   3/2018
CN   108369754 A   8/2018
(Continued)

OTHER PUBLICATIONS

English translation of the Written Opinion of the International Search Authority for PCT/JP2019/028463, dated Jun. 2, 2021, retrieved from https://globaldossier.uspto.gov/#/details/JP/PCT%252FJP2019%252F028463/W/98717 (Year: 2021).*
(Continued)

*Primary Examiner* — Calvin Cheung
(74) *Attorney, Agent, or Firm* — CHIP LAW GROUP

(57) ABSTRACT

[Object] To provide a vehicle-mounted camera that is capable of capturing a high-quality image. [Solving Means] A vehicle-mounted camera includes an imaging device, a housing, and an optical system. The housing includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering
(Continued)

from the outer space is reflected. The optical system causes light entering the opening from the outer space to be imaged onto the imaging device.

10 Claims, 11 Drawing Sheets

(51) Int. Cl.
  *G01C 21/34* (2006.01)
  *G02B 5/20* (2006.01)
  *G06V 20/56* (2022.01)
  *H04N 23/50* (2023.01)
  *H04N 23/80* (2023.01)
  *H04N 23/90* (2023.01)

(52) U.S. Cl.
  CPC .......... *G03B 30/00* (2021.01); *G06V 20/56* (2022.01); *H04N 23/50* (2023.01); *H04N 23/80* (2023.01); *H04N 23/90* (2023.01)

(58) Field of Classification Search
  CPC ...... G03B 2217/002; G03B 3/00; G03B 3/10; G03B 11/00; G03B 11/045; G03B 15/006; G03B 17/02; G06V 20/56; H04N 23/50; H04N 23/80; H04N 23/90; H04N 23/52; H04N 23/55; H04N 23/57
  See application file for complete search history.

(56) References Cited

FOREIGN PATENT DOCUMENTS

| DE | 102014218249 A1 | 12/2015 |
| DE | 102017215819 A1 | 3/2018 |
| EP | 2982941 A1 | 2/2016 |
| EP | 3413271 A1 | 12/2018 |
| JP | 2003-300414 A | 10/2003 |
| JP | 2016-014564 A | 1/2016 |
| JP | 2018-042141 A | 3/2018 |
| JP | 2018-084950 A | 5/2018 |
| WO | 2018/096795 A1 | 5/2018 |

OTHER PUBLICATIONS

International Search Report and Written Opinion of PCT Application No. PCT/JP2019/028463, dated Oct. 8, 2019, 08 pages of ISRWO.

Partial European Search Report of EP Application No. 19847756.4, dated Jul. 22, 2021, 13 pages.

* cited by examiner

VEHICLE-MOUNTED CAMERA AND DRIVE CONTROL SYSTEM USING VEHICLE-MOUNTED CAMERA

CROSS REFERENCE TO RELATED APPLICATIONS

This application is a U.S. National Phase of International Patent Application No. PCT/JP2019/028463 filed on Jul. 19, 2019, which claims priority benefit of Japanese Patent Application No. JP 2018-147409 filed in the Japan Patent Office on Aug. 6, 2018. Each of the above-referenced applications is hereby incorporated herein by reference in its entirety.

TECHNICAL FIELD

The present technology relates to a vehicle-mounted camera and a drive control system using the vehicle-mounted camera.

BACKGROUND ART

A technology is known that uses a front camera that captures an image of the scenery ahead of an automobile in order to control driving of the automobile. In this technology, driving of an automobile is controlled on the basis of, for example, the position and the movement of an object detected from an image captured by a front camera. Thus, it is necessary that a high-quality image be captured by a front camera used to control driving of an automobile.

An imaging device is used in an image-capturing apparatus such as a front camera. A low-resolution image is captured by the image-capturing apparatus when the imaging device is out of the depth of focus due to a structural member being thermally expanded due to an increase in temperature. Thus, in order to capture a high-resolution image, it is necessary that an image-capturing apparatus have a configuration in which the temperature is less likely to be increased.

Patent Literature 1 discloses a technology that makes it possible to suppress an increase in a temperature of an image-capturing apparatus. According to the technology disclosed in Patent Literature 1, the image-capturing apparatus is connected to a metallic bracket using a heat-transfer member. Thus, heat generated by an inner chip is expelled into the bracket through the heat-transfer member, and this makes it possible to suppress an increase in a temperature of the image-capturing apparatus.

CITATION LIST

Patent Literature

Patent Literature 1: Japanese Patent Application Laid-open No. 2016-14564

DISCLOSURE OF INVENTION

Technical Problem

Without being blocked, the sunlight directly enters a housing of a front camera arranged inside of a windshield. Thus, in particular, the temperature is more likely to be increased in a front camera from among image-capturing apparatuses. Further, a lens flare such as a ghost is more likely to be caused in a front camera when reflected light of the sunlight in a housing of the front camera enters a lens.

As described above, with respect to a front camera that the sunlight easily enters, the quality of a captured image is more likely to be reduced due to a reduction in resolution due to an increase in temperature, or due to a lens flare being caused. Thus, it is necessary that a front camera be capable of capturing a high-quality image even in an environment in which the sunlight easily enters the front camera.

In view of the circumstances described above, an object of the present technology is to provide a vehicle-mounted camera that is capable of capturing a high-quality image and a drive control system using the vehicle-mounted camera.

Solution to Problem

In order to achieve the object described above, a vehicle-mounted camera according to an embodiment of the present technology includes an imaging device, a housing, and an optical system.

The housing includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected.

The optical system causes light entering the opening from the outer space to be imaged onto the imaging device.

In this vehicle-mounted camera, visible light entering the functional portion forming at least a portion of an outer face of the housing, is absorbed. Thus, the occurrence of reflected light of the visible light on the outer face is suppressed. Consequently, in this vehicle-mounted camera, the reflected light of visible light is less likely to enter the lens, and thus a lens flare is less likely to be caused in a captured image.

Further, in this vehicle-mounted camera, an increase in temperature due to infrared light being absorbed into the housing is less likely to be caused, since infrared light entering the functional portion is reflected off the functional portion. Consequently, a structural member is less likely to be thermally expanded in this vehicle-mounted camera, and thus the relative position of the optical system to the imaging device is less likely to be shifted. Therefore, the resolution of a captured image is less likely to be reduced in this vehicle-mounted camera.

As described above, this vehicle-mounted camera is capable of capturing a high-quality image.

The functional portion may have a stacking structure that includes an infrared-light reflection layer off which infrared light is reflected, and a visible-light absorption layer that absorbs visible light.

The visible-light absorption layer may be situated further outward than the infrared-light reflection layer, and infrared light may be transmitted through the visible-light absorption layer.

The infrared-light reflection layer may be situated further outward than the visible-light absorption layer, and visible light may be transmitted through the infrared-light reflection layer.

In these vehicle-mounted cameras, it is possible to provide a configuration in which visible light is absorbed into the functional portion having a stacking structure and infrared light is reflected off the functional portion.

The optical system may have a fixed focal point.

As described above, the temperature is less likely to be increased in this vehicle-mounted camera. Thus, the resolution of a captured image is less likely to be reduced even if the optical system has a fixed focal point.

The housing may include a plurality of the openings.

The vehicle-mounted camera may further include a plurality of the imaging devices each corresponding to a corresponding one of the plurality of the openings, and a plurality of the optical systems each corresponding to a corresponding one of the plurality of the openings.

In this configuration,

The optical system may include a plastic lens.

In this vehicle-mounted camera, a low thermal resistance plastic lens can be used since the temperature is less likely to be increased. This makes it possible to reduce manufacturing costs for the vehicle-mounted camera.

A drive control system according to an embodiment of the present technology is capable of controlling driving of a movable body that includes a windshield, and includes an imaging device, a housing, an optical system, a processing unit, an information generator, and a drive controller.

The imaging device captures a raw image.

The housing includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected.

The optical system causes light entering the opening from the outer space to be imaged onto the imaging device.

The processing unit includes an image processor that performs image processing on the raw image to generate a processed image, a recognition processor that performs recognition processing on the processed image to recognize an object, and a calculation processor that calculates object information related to the object.

The information generator generates drive control information related to the control of the driving of the movable body on the basis of a result of processing performed by the processing unit.

The drive controller controls the driving of the movable body on the basis of the drive control information.

In this drive control system, a high-quality image can be captured using the vehicle-mounted camera. Thus, it is possible to more accurately control driving of a movable body.

The processing unit may further include a mapping processor that creates a digital map using the processed image and the object information.

The processing unit may further include a path planning section that determines, using the digital map, a route along which the movable body travels.

In this drive control system, a high-quality image can be captured using the vehicle-mounted camera. Thus, it is possible to perform a more sophisticated drive control on a movable body.

MODE(S) FOR CARRYING OUT THE INVENTION

Embodiments of the present technology will now be described below with reference to the drawings.

[Vehicle-Mounted Camera 1]

(Overall Configuration)

Figure 1:
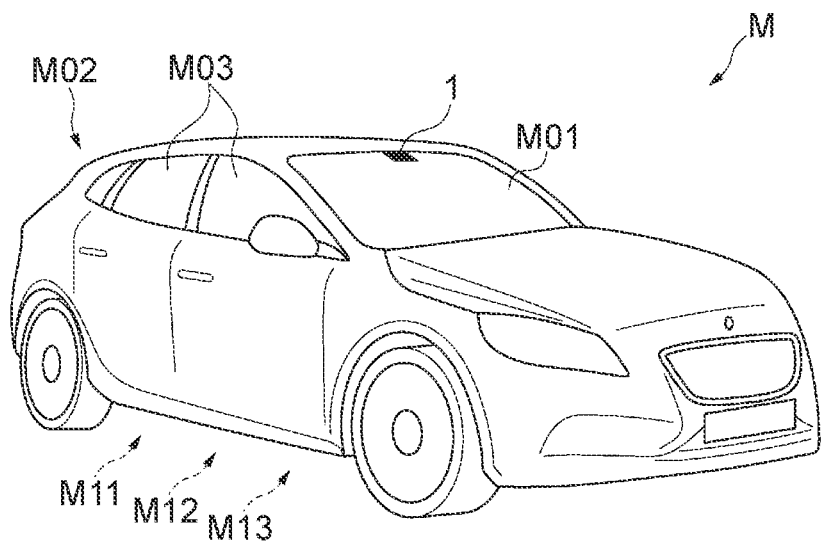
FIG. 1 is a perspective view of an automobile that includes a vehicle-mounted camera according to an embodiment of the present technology.

FIG. 1 is a perspective view of an automobile M that includes a vehicle-mounted camera 1 according to an embodiment of the present technology. The automobile M includes, as transparent glass windows, a windshield (front window) M01 arranged in front, a rear window M02 arranged in the rear, and side windows M03 arranged on the opposite lateral sides.

The vehicle-mounted camera 1 is a front sensing camera attached to an inner side of the windshield M01. The vehicle-mounted camera 1 is arranged in an upper portion of a central region in a width direction of the windshield M01. This enables the vehicle-mounted camera 1 to successfully capture an image of the scenery ahead of the automobile M without obstructing the view of a driver.

The automobile M including the vehicle-mounted camera 1 includes therein a driving force generating mechanism M11 including, for example, an engine and a motor, a braking mechanism M12, a steering mechanism M13, and the like, in order to implement a traveling function. Further, the automobile M may include, for example, a surrounding information detector used to detect surrounding information, and a positioning section used to generate position information.

Figure 2:
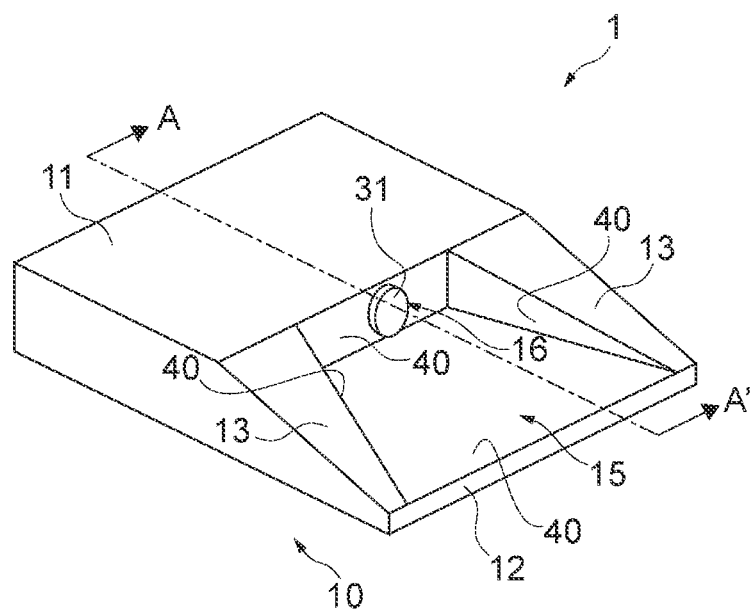
FIG. 2 is a perspective view of the vehicle-mounted camera.
Figure 3:
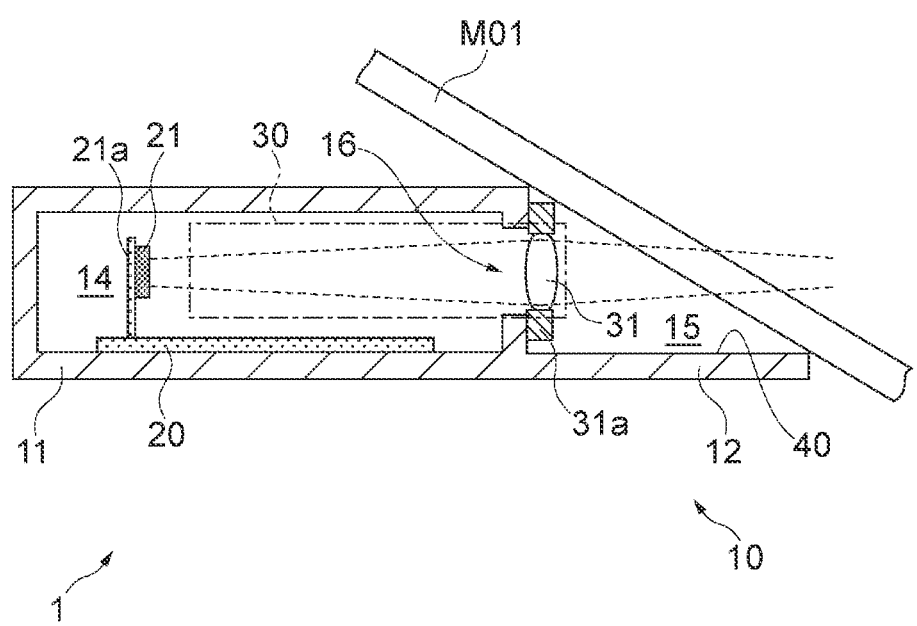
FIG. 3 is a cross-sectional view of the vehicle-mounted camera taken along the line A-A' of FIG. 2.

FIG. 2 is a perspective view of the vehicle-mounted camera 1 before being attached to the windshield M01. FIG. 3 is a cross-sectional view of the vehicle-mounted camera 1 taken along the line A-A' of FIG. 2, the vehicle-mounted camera 1 being attached to the windshield M01. In other words, FIG. 2 illustrates a longitudinal section of the vehicle-mounted camera 1 along a front-rear direction, the longitudinal section being in a central portion in a width direction of the vehicle-mounted camera 1.

The vehicle-mounted camera 1 includes a housing 10 that forms an outer shape of the vehicle-mounted camera 1. The housing 10 includes a hollow portion 11 that is a hollow rectangular parallelepiped, an extension portion 12 that extends forward from a lower portion of the hollow portion 11, and sidewall portions 13 that are arranged on the opposite sides in a width direction of the extension portion 12. An upper surface of the sidewall portion 13 of the vehicle-mounted camera 1 is bonded to an inner surface of the windshield M01.

An accommodation portion 14 is formed in the hollow portion 11 as an inner space of the hollow portion 11. Further, as illustrated in FIG. 3, a shield portion 15 that is an outer space closed by the windshield M01 is formed above the extension portion 12. An opening 16 that faces the windshield M01 and causes the accommodation portion 14 and the shield portion 15 to communicate with each other, is formed in the hollow portion 11.

The shield portion 15 is surrounded by a front surface of the hollow portion 11, an upper surface of the extension portion 12, and an inner side surface of the sidewall portion 13, and is shielded by the portions other than the windshield M01. This enables the housing 10 to only cause light transmitted through the windshield M01 to enter the opening 16 used to connect the shield portion 15 to the accommodation portion 14.

Further, the vehicle-mounted camera 1 includes a circuit board 20 and an imaging device 21. The circuit board 20 is arranged on a bottom surface of the accommodation portion 14. The imaging device 21 is arranged to be forwardly oriented through a connection board 21*a* that is upright on the circuit board 20. Note that the imaging device 21 may be directly mounted on the circuit board 20.

The imaging device 21 is not limited to a specific type. For example, a charge coupled device (CCD), a complementary metal-oxide semiconductor (CMOS), or the like can be used as the imaging device 21. Various ceramic substrates and plastic substrates can be used as the circuit board 20 and the connection board 21*a*.

Further, in addition to the imaging device 21, various components used to implement a function necessary for the vehicle-mounted camera 1 can be mounted on the circuit board 20. For example, an in-vehicle communication section used to transmit a captured image to another structural element included in the automobile M, an image processor used to perform image processing on a captured image, and the like can be mounted on the circuit board 20.

The vehicle-mounted camera 1 includes an optical system 30 that includes a lens 31 and has a fixed focal point. The lens 31 is attached to a front side of a peripheral portion of the opening 16 in the hollow portion 11 through a frame 31*a* that holds an outer periphery of the lens 31. Accordingly, only light transmitted through the lens 31 adjacent to a front portion of the opening 16 enters the opening 16.

The optical system 30 is configured such that light entering the opening 16 is imaged onto a light receiving surface of the imaging device 21. In addition to the lens, the optical system 30 may include, for example, an optical component such as a reflecting mirror or a prism. This makes it possible to guide light entering the lens 31 to the imaging device 21, regardless of the arrangement of the imaging device 21.

The housing 10 includes a functional portion 40 that forms at least a portion of an outer face of the housing 10 that is exposed to the outer space. Specifically, in the housing 10, the front surface of the hollow portion 11, the upper surface of the extension portion 12, and the inner side surface of the sidewall portion 13 that surround the shield portion 15 are formed of the functional portion 40. The functional portion 40 includes a function of suppressing the occurrence of reflected light and suppressing an increase in temperature.

Note that it is particularly favorable that the vehicle-mounted camera 1 of the present technology have a configuration in which the imaging device 21 has a size of 4.32 mm in height and 8.64 mm in width (a 1/1.7-type), the number of pixels of the imaging device 21 is equal to or greater than several million (in particular, seven million pixels or more), and the tolerable range of a deviation of a focal position of the optical system 30 is several micrometers. Further, it is also particularly favorable that the vehicle-mounted camera 1 of the present technology have a configuration in which the imaging device 21 has a higher pixel density than the 1/1.7-type imaging device 21 including seven million pixels, and the tolerable range of a deviation of the focal position of the optical system 30 is several micrometers.

Figure 4A:
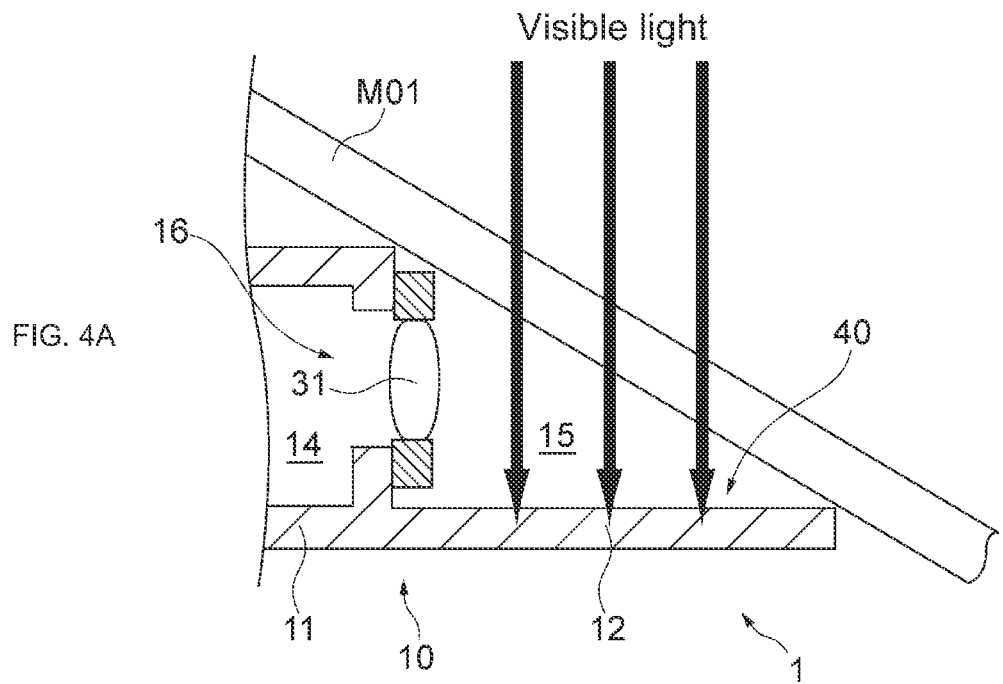
FIGS. 4A and 4B are set of partial cross-sectional views for describing a functional portion of the vehicle-mounted camera.
Figure 4B:
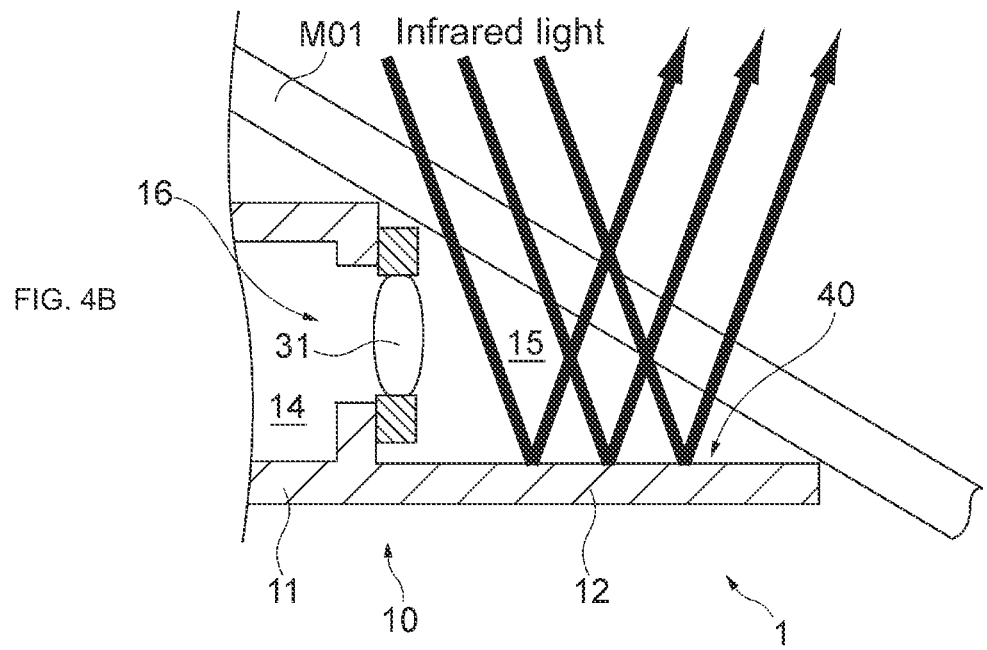

FIGS. 4A and 4B are set of partial cross-sectional views of the vehicle-mounted camera 1 that illustrates a portion around the shield portion 15. As illustrated in FIG. 4A, the functional portion 40 is configured such that visible light from among incident light is absorbed into the functional portion 40. In other words, the occurrence of reflected light of visible light is suppressed in the functional portion 40. Accordingly, reflected light of visible light is less likely to enter the lens 31 in the vehicle-mounted camera 1.

In particular, in the vehicle-mounted camera 1, it is possible to effectively prevent reflected light of visible light from entering the lens 31, since the outer face of the housing 10 that surrounds the shield portion 15 to which the lens 31 is exposed, is formed as the functional portion 40. Accordingly, a lens flare is less likely to be caused in a captured image in the vehicle-mounted camera 1.

Further, as illustrated in FIG. 4B, the functional portion 40 is configured such that infrared light from among incident light is reflected off the functional portion 40. In other words, in the vehicle-mounted camera 1, it is possible to release infrared light entering the functional portion 40 into the outer space. This results in being able to suppress an increase in the temperature of the housing 10 that is caused due to infrared light being absorbed.

Thus, in the vehicle-mounted camera 1, the position of the imaging device 21 is maintained within a depth of focus of the optical system 30. Consequently, the resolution of a captured image is less likely to be reduced. Further, it is possible to use a low thermal resistance component in the vehicle-mounted camera 1, and, for example, it is possible to use an inexpensive plastic lens as the lens 31.

Furthermore, as described above, light does not enter the shield portion 15 from anywhere but the windshield M01 in the vehicle-mounted camera 1. Thus, light reflected from below and from the side due to the ambient environment does not enter the shield portion 15 in the vehicle-mounted camera. Consequently, in the vehicle-mounted camera 1, it is possible to further suppress the occurrence of a lens flare in a captured image.

(Details of Functional Section 40)

FIGS. 5A, 5B, 6C, and 6B are sets of enlarged partial cross-sectional views of the functional portion 40 in the housing 10 of the vehicle-mounted camera 1. FIGS. 5A, 5B, 6C, and 6B each schematically illustrate a configuration example for implementing a function that causes visible light to be absorbed into the functional portion 40 and causes infrared light to be reflected off the functional portion 40. Note that the configuration of the functional portion 40 is not limited to the configuration examples illustrated in FIGS. 5A, 5B, 6C, and 6B, and various modifications may be made thereto.

Figure 5A:
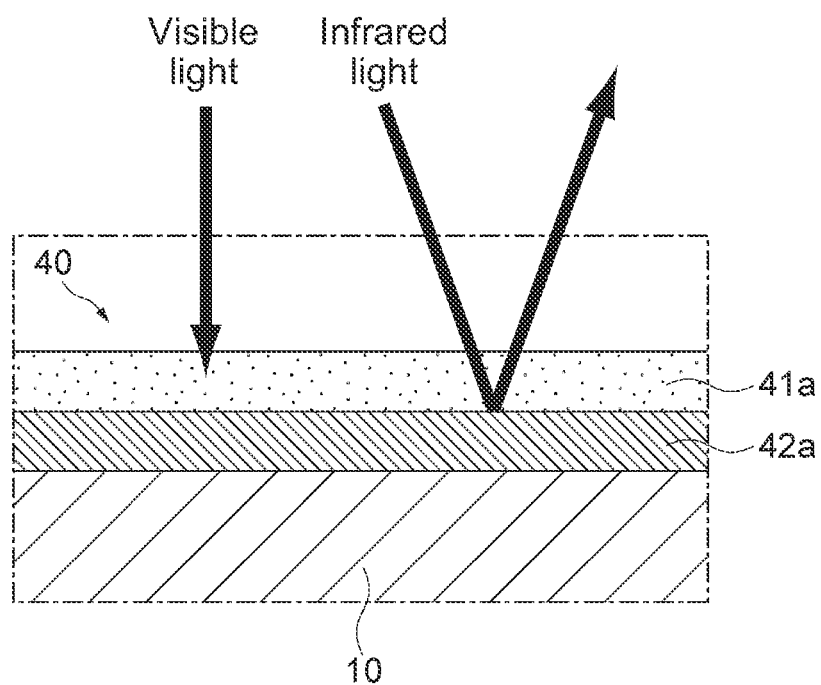
FIGS. 5A and 5B are set of partial cross-sectional views illustrating a configuration example of the functional portion.

The functional portion 40 illustrated in of FIG. 5A has a stacking structure including a visible-light absorption layer 41a and an infrared-light reflection layer 42a. In this functional portion 40, the infrared-light reflection layer 42a is stacked on the housing 10, and the visible-light absorption layer 41a is stacked on the infrared-light reflection layer 42a. In other words, the visible-light absorption layer 41a is arranged further outward than the infrared-light reflection layer 42a.

The visible-light absorption layer 41a is configured such that visible light (light of a wavelength of about 380 nm to 780 nm) is absorbed into the visible-light absorption layer 41a and infrared light (light of a wavelength of about 780 nm to 2500 nm) is transmitted through the visible-light absorption layer 41a. A known configuration can be used for the visible-light absorption layer 41a, and, for example, the visible-light absorption layer 41a can be formed of, for example, black paint that is made to have transmission characteristics with respect to the infrared region.

The infrared-light reflection layer 42a is configured such that infrared light is reflected off the infrared-light reflection layer 42a. A known configuration can be used for the infrared-light reflection layer 42a, and, for example, a metal plate on which mirror finishing has been performed, a metal-evaporated film obtained by evaporating metal onto the housing 10, or the like can be used for the infrared-light reflection layer 42a. The metal plate and the metal-evaporated film can be formed of, for example, aluminum.

Due to such a configuration, visible light is absorbed into the visible-light absorption layer 41a and infrared light transmitted through the visible-light absorption layer 41a is reflected off the infrared-light reflection layer 42a in the functional portion 40 illustrated in FIG. 5A. As described above, this functional portion 40 makes it possible to implement a function in which visible light is absorbed and infrared light is reflected.

Figure 5B:
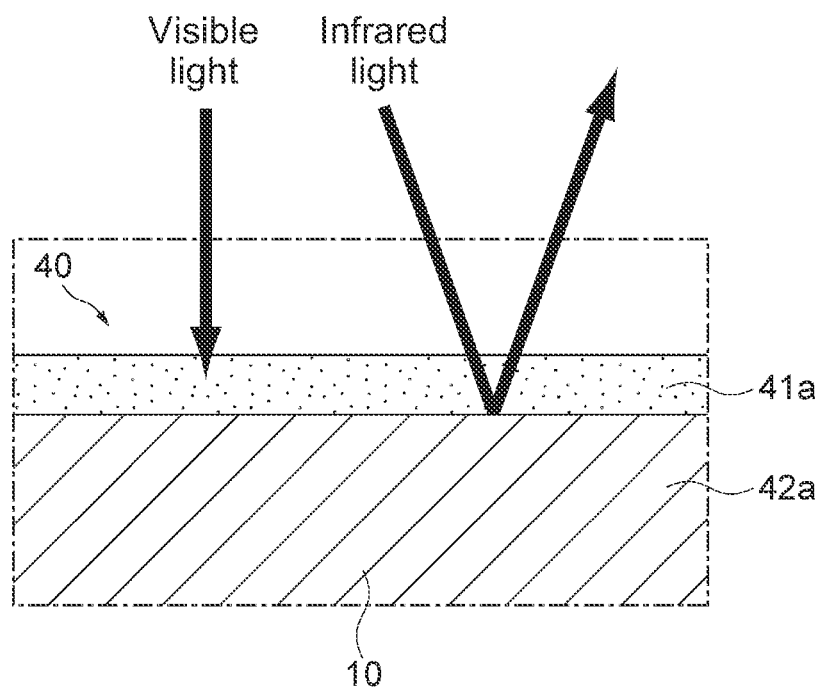

The functional portion 40 illustrated in FIG. 5B does not include the infrared-light reflection layer 42a illustrated in FIG. 5A, and the housing 10 itself serves as the infrared-light reflection layer 42a. In other words, when the housing 10 is made of, for example, aluminum on which mirror finishing has been performed, this enables the housing 10 itself to include a function in which infrared light is reflected off the housing 10.

In the functional portion 40 illustrated in FIGS. 5A and 5B, infrared light released by the black visible-light absorption layer 41a itself is also reflected off the infrared-light reflection layer 42a to be released into the outer space. Thus, an increase in temperature is further suppressed in the vehicle-mounted camera 1 due to a cooling effect provided by the release performed by the visible-light absorption layer 41a itself.

Figure 6A:
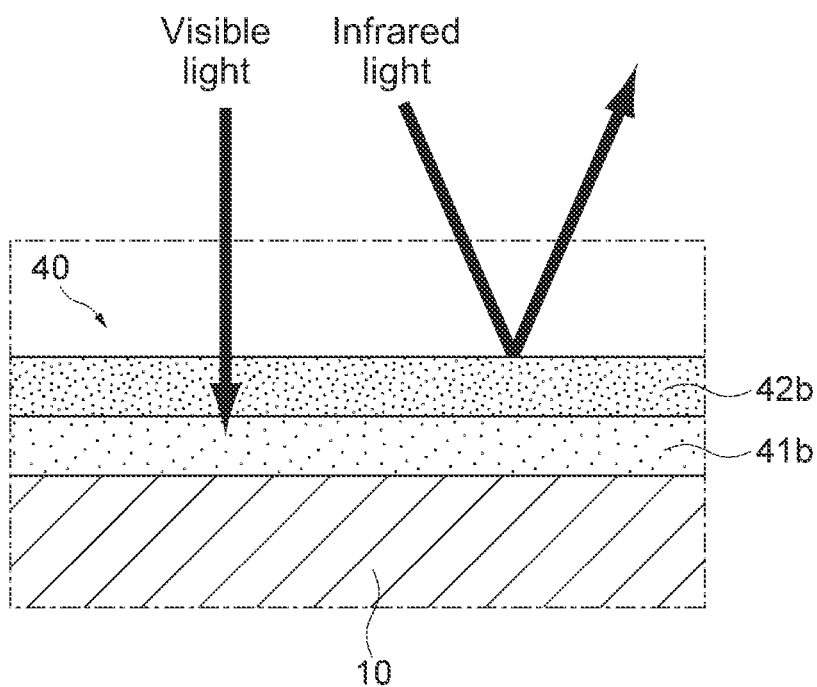
FIGS. 6A and 6B are set of partial cross-sectional views illustrating a configuration example of the functional portion.

The functional portion 40 illustrated in FIG. 6A has a stacking structure including a visible light absorption layer 41b and an infrared-light reflection layer 42b. In this functional portion 40, the visible-light absorption layer 41b is stacked on the housing 10, and the infrared-light reflection layer 42b is stacked on the visible-light absorption layer 41b. In other words, the visible-light absorption layer 41b is arranged further inward than the infrared-light reflection layer 42b.

The infrared-light reflection layer 42b is configured such that infrared light is reflected off the infrared-light reflection layer 42b and visible light is transmitted through the infrared-light reflection layer 42b. A known configuration can be used for the infrared-light reflection layer 42b, and, for example, a dielectric multilayer or the like that is made to have transmission characteristics with respect to the visible-light region and to have reflection characteristics with respect to the infrared region can be used for the infrared-light reflection layer 42b.

The visible-light absorption layer 41b is configured such that visible light is absorbed into the visible-light absorption layer 41b. A known configuration can be used for the visible-light absorption layer 41b, and, for example, the visible-light absorption layer 41b can be formed of, for example, black paint or a black plastic film. Further, the visible-light absorption layer 41b may be a black layer formed by surface treatment being performed on the housing 10.

Due to such a configuration, infrared light is reflected off the infrared-light reflection layer 42b and visible light transmitted through the infrared-light reflection layer 42b is absorbed into the visible-light absorption layer 41b in the functional portion 40 illustrated in FIG. 6A. As described above, this functional portion 40 makes it possible to implement a function in which visible light is absorbed and infrared light is reflected.

Figure 6B:
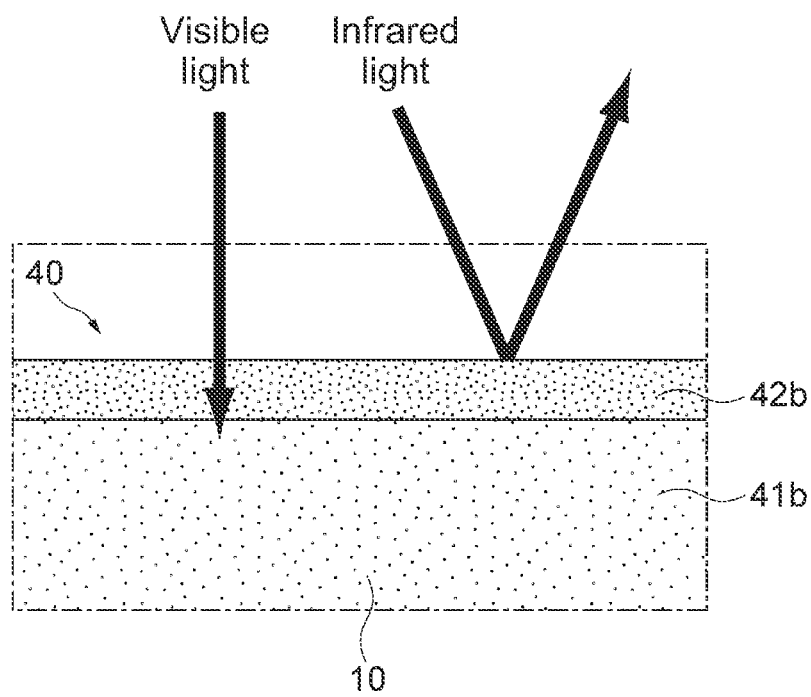

The functional portion 40 illustrated in FIG. 6B does not include the visible-light absorption layer 41b illustrated in FIG. 6A, and the housing 10 itself serves as the visible-light absorption layer 41b. In other words, when the housing 10 is made of, for example, a black plastic, this enables the housing 10 itself to include a function in which visible light is absorbed into the housing 10.

(Another Configuration Example of Vehicle-Mounted Camera 1)

Figure 7:
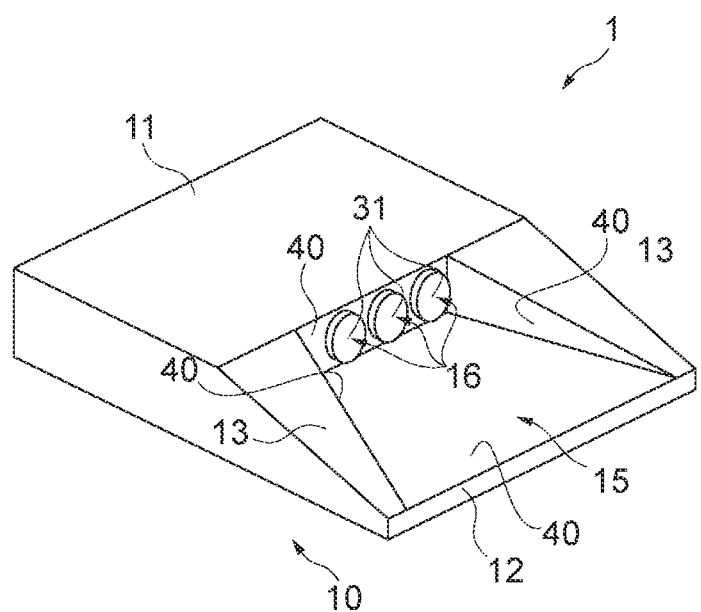
FIG. 7 is a perspective view illustrating another embodiment of the vehicle-mounted camera.

The configuration of the vehicle-mounted camera 1 is not limited to the configurations described above, and various modifications may be made thereto. For example, as illustrated in FIG. 7, the housing 10 may include a plurality of openings 16, and the optical system 30 and the imaging device 21 may be provided for each of the plurality of openings 16. In this case, for example, the angle of view may be different for each optical system 30 in the vehicle-mounted camera 1.

Further, the functional portion 40 is not limited to the arrangement described above. The effects described above are provided when the functional portion 40 is arranged in at least a portion of the outer face of the housing 10. In particular, the functional portion 40 may be arranged in an entire region of the outer face of the housing 10. This results in the vehicle-mounted camera 1 having an excellent appearance, and also in obtaining the cooling effect provided by release performed in the entire region of the outer face of the housing 10. This makes it possible to more effectively suppress an increase in the temperature of the vehicle-mounted camera 1.

Note that it is favorable that the entire region of the outer face of the housing 10 of the vehicle-mounted camera 1 be black although the functional portion 40 does not have to be arranged in the entire region of the outer face of the housing 10. This results in the vehicle-mounted camera 1 having an excellent appearance and also being less likely to be affected by entrance of the sunlight. In particular, this makes it possible to capture a high-quality image.

Furthermore, the vehicle-mounted camera 1 can be attached not only to the windshield M01, but also to the rear window M02 as a rear-sensing camera. Moreover, the vehicle-mounted camera 1 may be used for, for example, viewing, not for sensing. In this case, it is possible to display and record a high-quality video using the vehicle-mounted camera 1.

Further, the vehicle-mounted camera 1 does not have to be directly bonded to the inner surface of the windshield M01, and, for example, the vehicle-mounted camera 1 may be fixed to a ceiling of the automobile M through a bracket or the like. Furthermore, the vehicle-mounted camera 1 may have a configuration in which the shield portion 15 is not formed, and, for example, the vehicle-mounted camera 1 may be integrated with a rearview mirror.

In addition, the vehicle-mounted camera 1 is applicable not only to the automobile M, but also to various movable bodies. Examples of a movable body to which the vehicle-mounted camera 1 is applicable include an automobile, an electric vehicle, a hybrid electric vehicle, a motorcycle, a bicycle, personal mobility, an airplane, a drone, a ship, a robot, construction machinery, and agricultural machinery (a tractor).

[Drive Control System 100]
(Brief Description)

A drive control system 100 according to an embodiment of the present disclosure is a system used to control driving of the automobile M using the vehicle-mounted camera 1 described above. Specifically, the drive control system 100 controls the driving force generating mechanism M11, the braking mechanism M12, the steering mechanism M13, and the like of the automobile M using an image captured using the vehicle-mounted camera 1.

The drive control system 100 may have a configuration corresponding to a function necessary for the automobile M. Specifically, examples of a function that can be implemented by the drive control system 100 include a driving assistance function and an autonomous driving function. A configuration of the drive control system 100 making it possible to implement the driving assistance function and the autonomous driving function is described below.

(Driving Assistance Function)

The driving assistance function is typically a function of advanced driver-assistance systems (ADAS) including collision avoidance, shock mitigation, following driving (maintaining a following distance), vehicle speed maintaining driving, a warning of collision, a warning of deviation from a lane, and the like. The drive control system 100 may be configured such that these driving assistance functions can be implemented.

Figure 8:
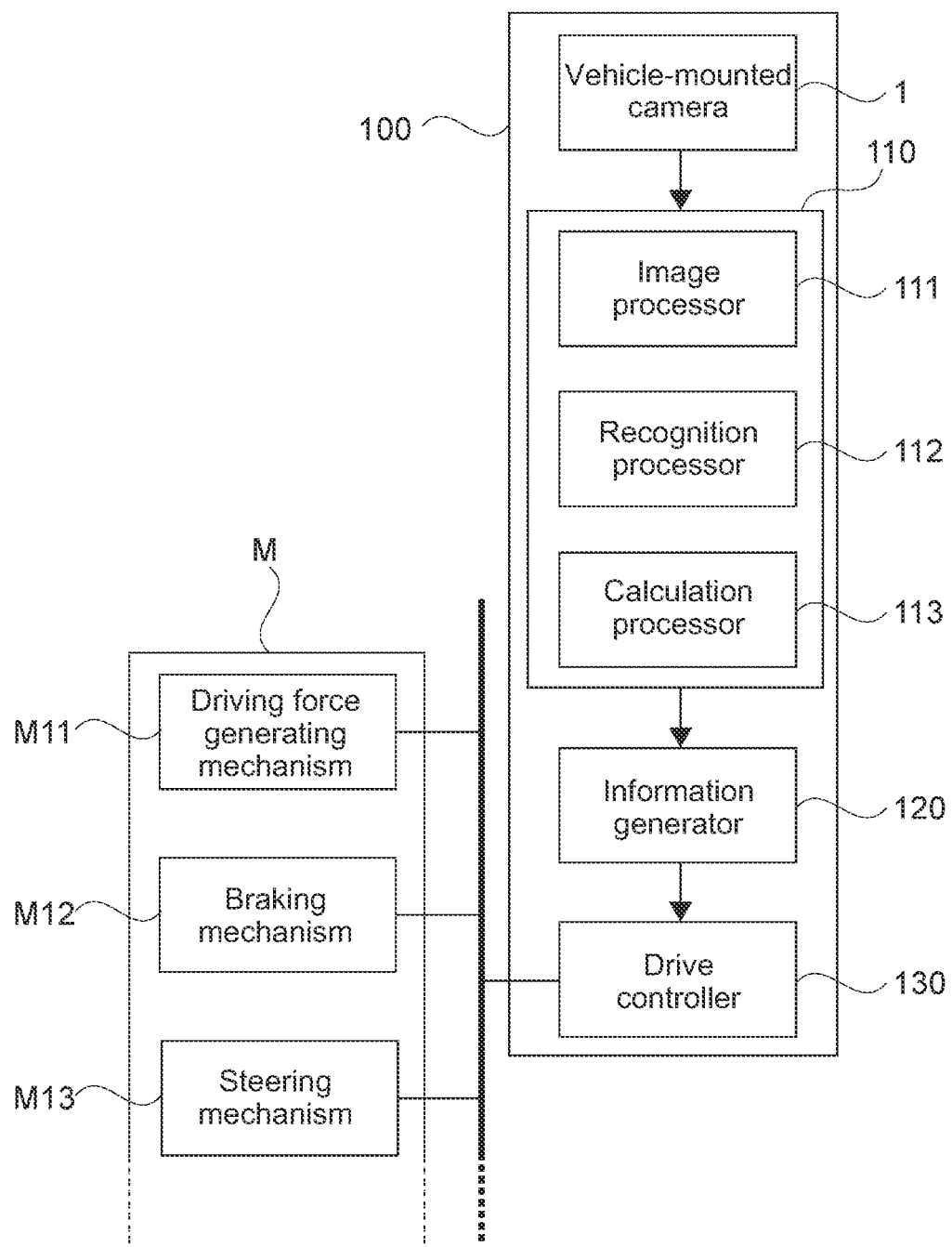
FIG. 8 is a block diagram illustrating a configuration that makes it possible to implement a driving assistance function in a drive control system according to an embodiment of the present technology.

FIG. 8 is a block diagram illustrating the configuration of the drive control system 100 making it possible to implement the driving assistance function. The drive control system 100 includes the vehicle-mounted camera 1, a processor 110, an information generator 120, and a drive controller 130. The processor 110 includes an image processor 111, a recognition processor 112, and a calculation processor 113.

The respective structural elements of the drive control system 100 are connected to each other through a communication network. The communication network may be, for example, a vehicle-mounted communication network that conforms to any standard such as a controller area network (CAN), a local interconnect network (LIN), a local area network (LAN), or FlexRay (registered trademark).

Figure 9:
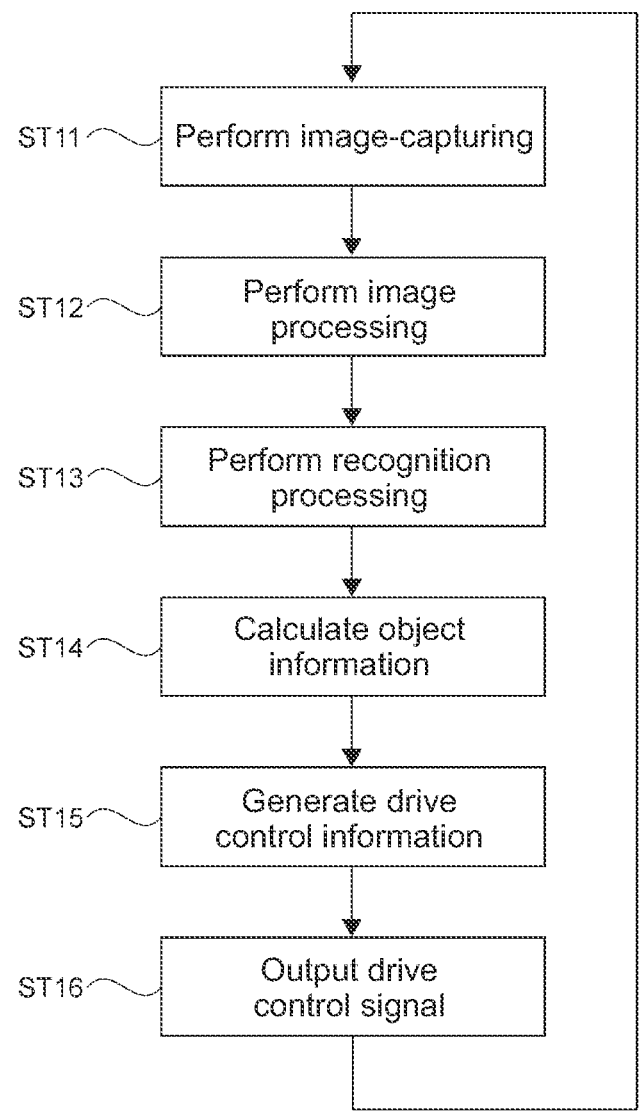
FIG. 9 is a flowchart illustrating a drive control method performed by the drive control system.

FIG. 9 is a flowchart illustrating a drive control method performed by the drive control system 100 illustrated in FIG. 8. The drive control method illustrated in FIG. 9 includes Step ST11 of image-capturing, Step ST12 of image processing, Step ST13 of recognition processing, Step ST14 of object-information calculation, Step ST15 of drive-control-information generation, and Step ST16 of drive-control-signal output.

In Step ST11 of image-capturing, the vehicle-mounted camera 1 captures an image of the scenery ahead of the automobile M through the windshield M01 to generate a raw image of the scenery. As described above, a high-quality raw image is obtained using the vehicle-mounted camera 1 due to a function of the functional portion 40. For example, the vehicle-mounted camera 1 transmits the raw image to the processor 110 using an in-vehicle communication section mounted on the circuit board 20.

The processor 110 typically includes an electronic control unit (ECU), and processes a raw image generated by the vehicle-mounted camera 1. More specifically, in the processor 110, the image processor 111 performs Step ST12 of image processing, the recognition processor 112 performs Step ST13 of recognition processing, and the calculation processor 113 performs Step ST14 of object-information calculation.

In Step ST12 of image processing, the image processor 111 performs image processing on the raw image to generate a processed image. The image processing performed by image processor 111 is typically processing performed to make it easy to recognize an object in a raw image, and examples of the image processing performed by image processor 111 include an automatic exposure control, an automatic white-balance adjustment, and high dynamic range combining.

Note that, in Step ST12 of image processing, at least a portion of the image processing may be performed by an image processor mounted on the circuit board 20 of the vehicle-mounted camera 1. Note that, when the image processor of the vehicle-mounted camera 1 performs all of the image processing of Step ST12 of image processing, the processor 110 does not have to include the image processor 111.

In Step ST13 of recognition processing, the recognition processor 112 performs recognition processing on the processed image to recognize an object in the processed image. Note that the object recognized by the recognition processor 112 is not limited to a three-dimensional object, and examples of the recognized object include a vehicle, a pedestrian, an obstacle, a traffic light, a traffic sign, a lane of a road, and a curb.

In Step ST14 of calculation processing, the calculation processor 113 calculates object information related to an object in the processed image. Examples of the object information calculated by the calculation processor 113 include the shape of an object, the distance to an object, and the movement direction and the movement speed of an object. The calculation processor 113 uses a plurality of temporally consecutive processed images to calculate dynamic object information.

Figure 10:
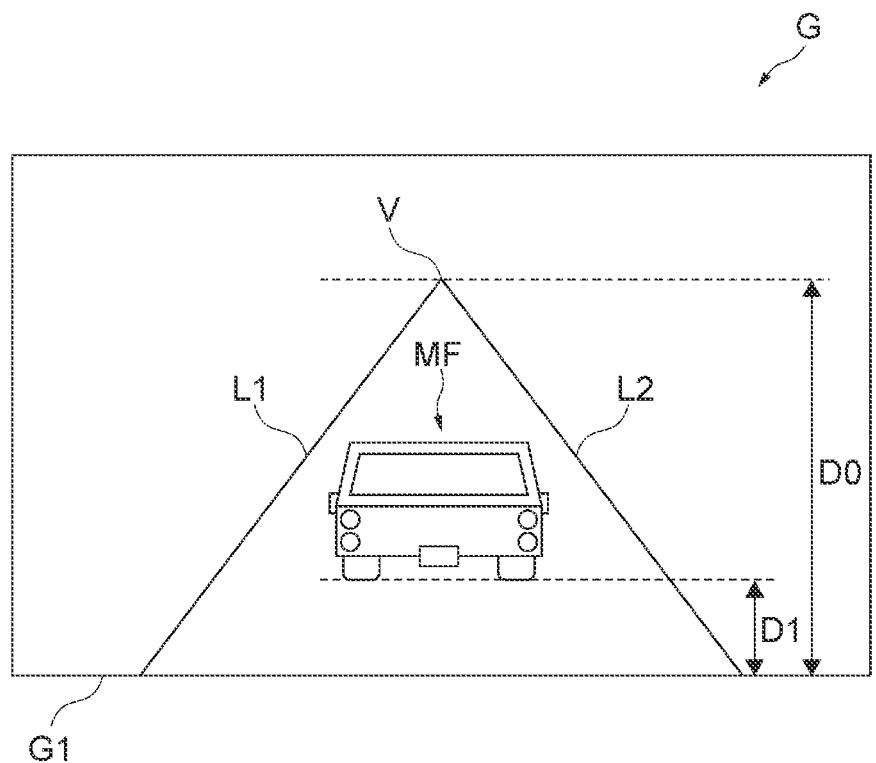
FIG. 10 is a diagram for describing an example of a method for calculating a following distance to a preceding vehicle that is performed by a calculation processor of the drive control system.

A method for calculating a following distance to a preceding automobile MF is described as an example of the method for calculating object information that is performed by the calculation processor 113. FIG. 10 illustrates an example of a processed image G generated by the image processor 111. The preceding automobile MF, and two lanes L1 and L2 that define travel lanes appear in the processed image G illustrated in FIG. 10.

First, a vanishing point V at which the two lanes L1 and L2 intersect is obtained in the processed image G. Note that the vanishing point V may be obtained from other objects without using the lanes L1 and L2. For example, the calculation processor 113 may also obtain the vanishing point V using, for example, a curb, or a movement trajectory of a fixed object such as a traffic sign in a plurality of processed images.

Next, a distance D0 from a lower edge G1 of the processed image to the vanishing point V (a dimension in an up-down direction of the image), and a distance D1 from the lower edge G1 of the processed image to the preceding automobile MF (a dimension in the up-down direction of the image) are obtained. The following distance to the preceding automobile MF can be obtained using the distances D0 and D1. For example, the use of a ratio between the distance D0 and the distance D1 makes it possible to calculate the following distance to the preceding automobile MF.

The processor 110 transmits, to the information generator 120, data including the processed image and the object information that are obtained in Steps ST12 to ST14. Note that the processor 110 is not limited to the configuration described above, and, for example, the processor 110 may include a structural element other than image processor 111, the recognition processor 112, and the calculation processor 113.

In Step ST15 of drive-control-information generation, the information generator 120 generates drive control information including details of driving necessary for the automobile M. More particularly, on the basis of the data transmitted by the processor 110, the information generator 120 determines details of driving to be performed by the automobile M, and generates drive control information including the details of driving.

Examples of the details of driving of the automobile M include a change in speed (acceleration and deceleration) and a change in traveling direction. The following are specific examples: when the following distance of the automobile M to the preceding automobile MF is small, the information generator 120 determines that the automobile M is to be decelerated, and when the automobile M is likely to deviate from its lane, the information generator 120 determines that the traveling direction is to be changed such that the automobile M moves toward a lane center.

The information generator 120 transmits the drive control information to the drive controller 130. Note that the information generator 120 may generate information other than the drive control information. For example, the information generator 120 may detect the brightness in the ambient environment from a processed image, and may generate information regarding an illumination control performed to turn on a headlight of the automobile M when it is dark in the ambient environment.

In Step ST16 of drive-control-signal output, the drive controller 130 outputs a drive control signal on the basis of the drive control information. For example, the drive controller 130 can accelerate the automobile M using the driving force generating mechanism M11, decelerate the automobile M using the braking mechanism M12, and change a traveling direction of the automobile M using the steering mechanism M13.

(Autonomous Driving Function)

The autonomous driving function is a function of autonomously driving the automobile M without an operation being performed by a driver. In order to implement an autonomous driving function, there is a need for a more sophisticated drive control, compared to the case of the driving assistance function. The use of the vehicle-mounted camera 1 being capable of generating a high-quality raw image enables the drive control system 100 to more accurately perform a sophisticated drive control that makes it possible to implement an autonomous driving function.

Figure 11:
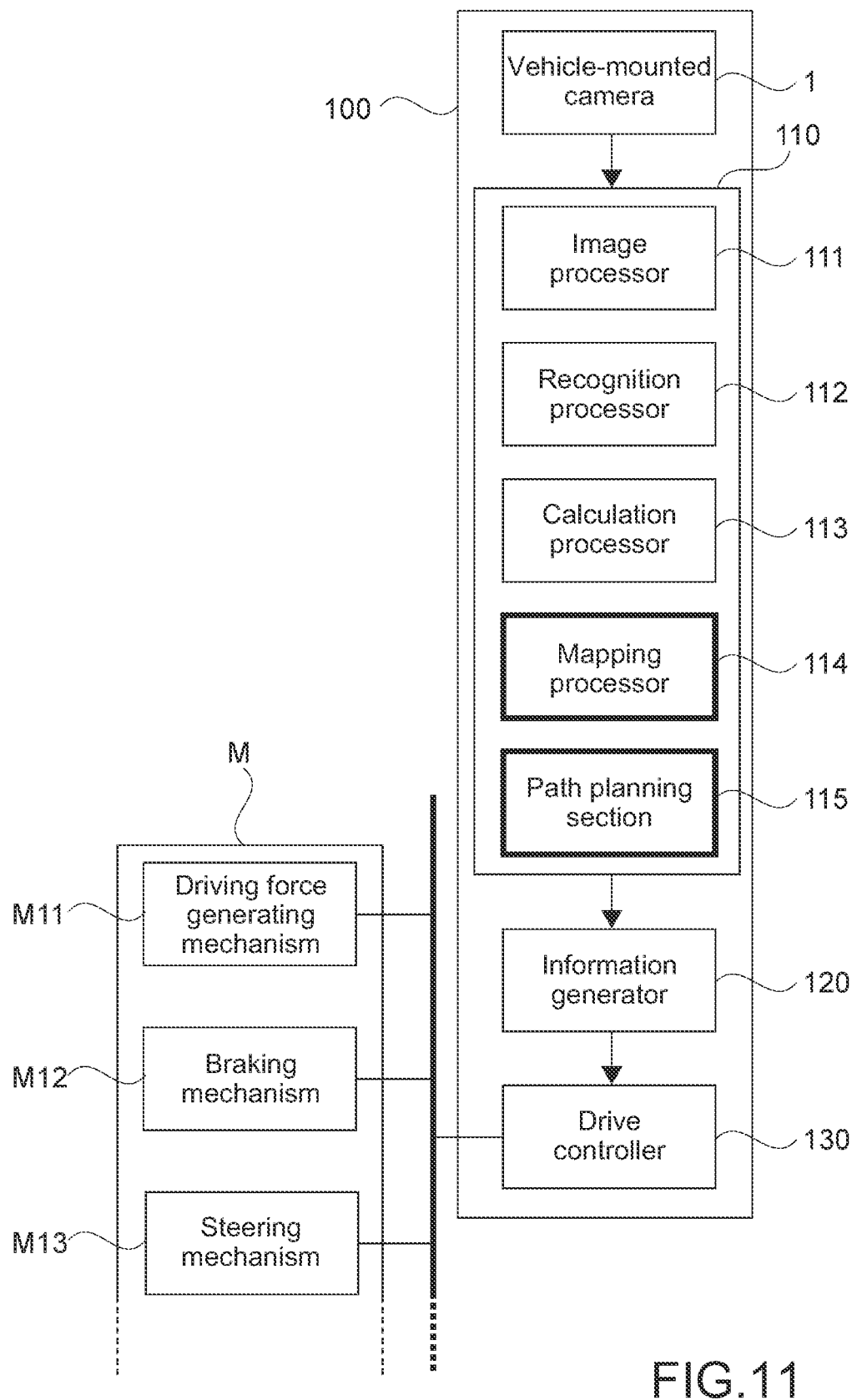
FIG. 11 is a block diagram illustrating a configuration that makes it possible to implement an autonomous driving function in the drive control system.

FIG. 11 is a block diagram illustrating a configuration of the drive control system 100 making it possible to implement an autonomous driving function. In addition to the respective structural elements illustrated in FIG. 8, this drive control system 100 further includes a mapping processor 114 and a path planning section 115 that are included in the processor 110. Descriptions of structural elements similar to those illustrated in FIG. 8 are omitted below as appropriate.

Figure 12:
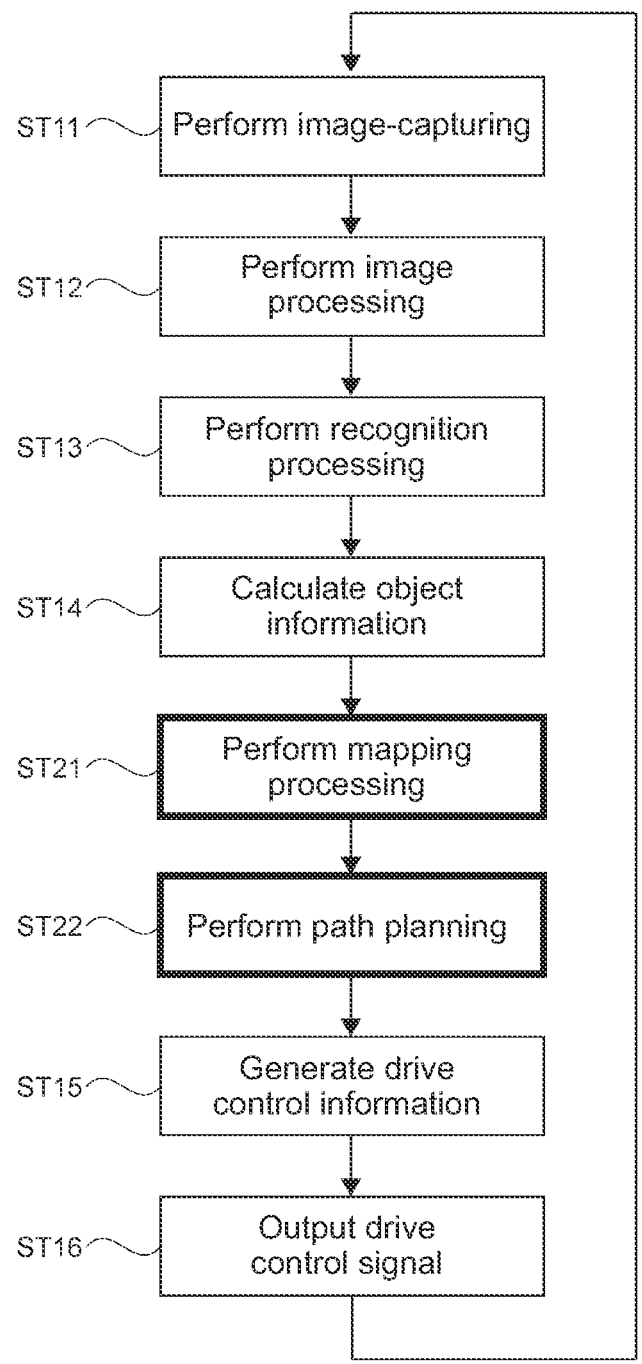
FIG. 12 is a flowchart illustrating a drive control method performed by the drive control system.

FIG. 12 is a flowchart illustrating a drive control method performed by the drive control system 100 illustrated in FIG. 11. In addition to the respective steps illustrated in FIG. 9, the drive control method illustrated in FIG. 12 includes Step ST21 of mapping processing, which is performed by the mapping processor 114, and Step ST22 of path planning, which is performed by the path planning section 115.

As illustrated in FIG. 12, Step ST21 of mapping processing and Step ST22 of path planning are performed between Step ST14 of object-information calculation and Step ST15 of drive-control-information generation. Step ST22 of path planning is performed after Step ST21 of mapping processing.

In Step ST21 of mapping processing, the mapping processor 114 performs spatial mapping using a processed image and object information to create a digital map. The digital map created by the mapping processor 114 is a three-dimensional map created by combining static information and dynamic information that are necessary to perform autonomous driving.

In the drive control system 100, it is possible to create a high-resolution digital map using the mapping processor 114 since a high-quality raw image is obtained using the vehicle-mounted camera 1. Note that the mapping processor 114 can create a digital map including more information by acquiring information other than a raw image obtained using the vehicle-mounted camera 1.

For example, the mapping processor 114 can acquire information from, for example, a surrounding information detector and a positioning section that is included in the automobile M. Further, the mapping processor 114 can acquire various information by communicating with various apparatuses situated in the external environment through a vehicle-exterior communication section that makes it possible to perform a vehicle-exterior communication.

The surrounding information detector is configured as, for example, an ultrasonic sensor, a radar device, a LIDAR (light detection and ranging, laser imaging detection and ranging) device, or the like. The mapping processor 114 can also acquire, from the surrounding information detector, information regarding, for example, regions in the rear and on the lateral side of the automobile M that is not easily obtained from the vehicle-mounted camera 1.

The positioning section is capable of receiving, for example, a global navigation satellite system (GNSS) signal from a GNSS satellite (such as a Global Positioning System (GPS) signal from a GPS satellite) and performing positioning. The mapping processor 114 can acquire information regarding the position of the automobile M from the positioning section.

The vehicle-exterior communication section may use, for example, Global System for Mobile Communications (GSM) (registered trademark), WiMAX (registered trademark), Long-Term Evolution (LTE) (registered trademark), LTE-advanced (LTE-A), a wireless LAN (also referred to as Wi-Fi (registered trademark)), Bluetooth (registered trademark), or the like.

In Step ST22 of path planning, the path planning section 115 performs path planning performed to determine a traveling route of the automobile M, using a digital map. Examples of the path planning include various processes such as detection of an empty space on a road, and prediction of the movement of an object such as a vehicle and a human.

After Step ST22 of path planning, the processor 110 collectively transmits, to the information generator 120, data including the digital map and a result of the path planning that are obtained in Steps ST21 and ST22, in addition to the data including the processed image and the object information that are obtained in Steps ST12 to ST14.

In Step ST15 of drive-control-information generation, the information generator 120 generates drive control information including details of driving performed to cause the automobile M to travel along a traveling route in accordance with the path planning determined in Step ST22 of path planning. The information generator 120 transmits the generated drive control information to the drive controller 130.

In Step ST16 of drive-control-signal output, the drive controller 130 outputs a drive control signal on the basis of the drive control information. In other words, the drive controller 130 controls driving of the driving force generating mechanism M11, the braking mechanism M12, the steering mechanism M13, and the like such that the automobile M can safely travel along a traveling route in accordance with the path planning.

Other Embodiments

The embodiments of the present technology have been described above. However, of course the present technology is not limited to the embodiments described above, and various modifications may be made thereto without departing from the scope of the present technology.

Note that the present technology may also take the following configurations.

(1) A vehicle-mounted camera, including:
an imaging device;
a housing that includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected; and
an optical system that causes light entering the opening from the outer space to be imaged onto the imaging device.

(2) The vehicle-mounted camera according to (1), in which
the functional portion has a stacking structure that includes an infrared-light reflection layer off which infrared light is reflected, and a visible-light absorption layer that absorbs visible light.

(3) The vehicle-mounted camera according to (2), in which
the visible-light absorption layer is situated further outward than the infrared-light reflection layer, and infrared light is transmitted through the visible-light absorption layer.

(4) The vehicle-mounted camera according to (2), in which
the infrared-light reflection layer is situated further outward than the visible-light absorption layer, and visible light is transmitted through the infrared-light reflection layer.

(5) The vehicle-mounted camera according to any one of (1) to (4), in which
the optical system has a fixed focal point.

(6) The vehicle-mounted camera according to any one of (1) to (5), in which
the housing includes a plurality of the openings, and
the vehicle-mounted camera further includes a plurality of the imaging devices each corresponding to a corresponding one of the plurality of the openings, and a plurality of the optical systems each corresponding to a corresponding one of the plurality of the openings.

(7) The vehicle-mounted camera according to any one of (1) to (6), in which
the optical system includes a plastic lens.

(8) A drive control system that is used to control driving of a movable body that includes a windshield, the drive control system including:
an imaging device that captures a raw image;
a housing that includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected, the housing being arranged on an inner side of the windshield such that the opening faces the windshield;
an optical system that causes light entering the opening from the outer space to be imaged onto the imaging device;
a processing unit that includes an image processor that performs image processing on the raw image to generate a processed image, a recognition processor that performs recognition processing on the processed image to recognize an object, and a calculation processor that calculates object information related to the object;
an information generator that generates drive control information related to the control of the driving of the movable body on the basis of a result of processing performed by the processing unit; and
a drive controller that controls the driving of the movable body on the basis of the drive control information.

(9) The drive control system according to (8), in which
the processing unit further includes a mapping processor that creates a digital map using the processed image and the object information.

(10) The drive control system according to (9), in which
the processing unit further includes a path planning section that determines a traveling route of the movable body using the digital map.

REFERENCE SIGNS LIST 1 vehicle-mounted camera
10 housing
11 hollow portion 12 extension portion
13 sidewall portion
14 accommodation portion
15 shield portion
16 opening
20 circuit board
21 imaging device
30 optical system
31 lens
40 functional portion
41a, 41b visible-light absorption layer
42a, 42b infrared-light reflection layer
100 drive control system
110 processor
111 image processor
112 recognition processor
113 calculation processor
114 mapping processor
115 path planning section
120 information generator
130 drive controller
M automobile
M1 windshield

The invention claimed is:

1. A vehicle-mounted camera, comprising:
an imaging device;
a housing that includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected; and
an optical system that causes light entering the opening from the outer space to be imaged onto the imaging device.

2. The vehicle-mounted camera according to claim 1, wherein
the functional portion has a stacking structure that includes an infrared-light reflection layer off which infrared light is reflected, and a visible-light absorption layer that absorbs visible light.

3. The vehicle-mounted camera according to claim 2, wherein
the visible-light absorption layer is situated further outward than the infrared-light reflection layer, and infrared light is transmitted through the visible-light absorption layer.

4. The vehicle-mounted camera according to claim 2, wherein
the infrared-light reflection layer is situated further outward than the visible-light absorption layer, and visible light is transmitted through the infrared-light reflection layer.

5. The vehicle-mounted camera according to claim 1, wherein
the optical system has a fixed focal point.

6. The vehicle-mounted camera according to claim 1, wherein
the housing includes a plurality of the openings, and
the vehicle-mounted camera further includes a plurality of the imaging devices each corresponding to a corresponding one of the plurality of the openings, and a plurality of the optical systems each corresponding to a corresponding one of the plurality of the openings.

7. The vehicle-mounted camera according to claim 1, wherein
the optical system includes a plastic lens.

8. A drive control system that is used to control driving of a movable body that includes a windshield, the drive control system comprising:
an imaging device that captures a raw image;
a housing that includes an accommodation portion that accommodates the imaging device, an outer face that is exposed to an outer space, an opening that causes the accommodation portion and the outer space to communicate with each other, and a functional portion that forms at least a portion of the outer face, the functional portion being a functional portion that absorbs visible light from among light entering from the outer space and off which infrared light from among the light entering from the outer space is reflected, the housing being arranged on an inner side of the windshield such that the opening faces the windshield;
an optical system that causes light entering the opening from the outer space to be imaged onto the imaging device;
a processing unit that includes an image processor that performs image processing on the raw image to generate a processed image, a recognition processor that performs recognition processing on the processed image to recognize an object, and a calculation processor that calculates object information related to the object;
an information generator that generates drive control information related to the control of the driving of the movable body on a basis of a result of processing performed by the processing unit; and
a drive controller that controls the driving of the movable body on a basis of the drive control information.

9. The drive control system according to claim 8, wherein
the processing unit further includes a mapping processor that creates a digital map using the processed image and the object information.

10. The drive control system according to claim 9, wherein
the processing unit further includes a path planning section that determines a traveling route of the movable body using the digital map.

* * * * *